March 28, 1972 E. J. TISCHLER Re. 27,317
TIMER
Original Filed Nov. 1, 1967
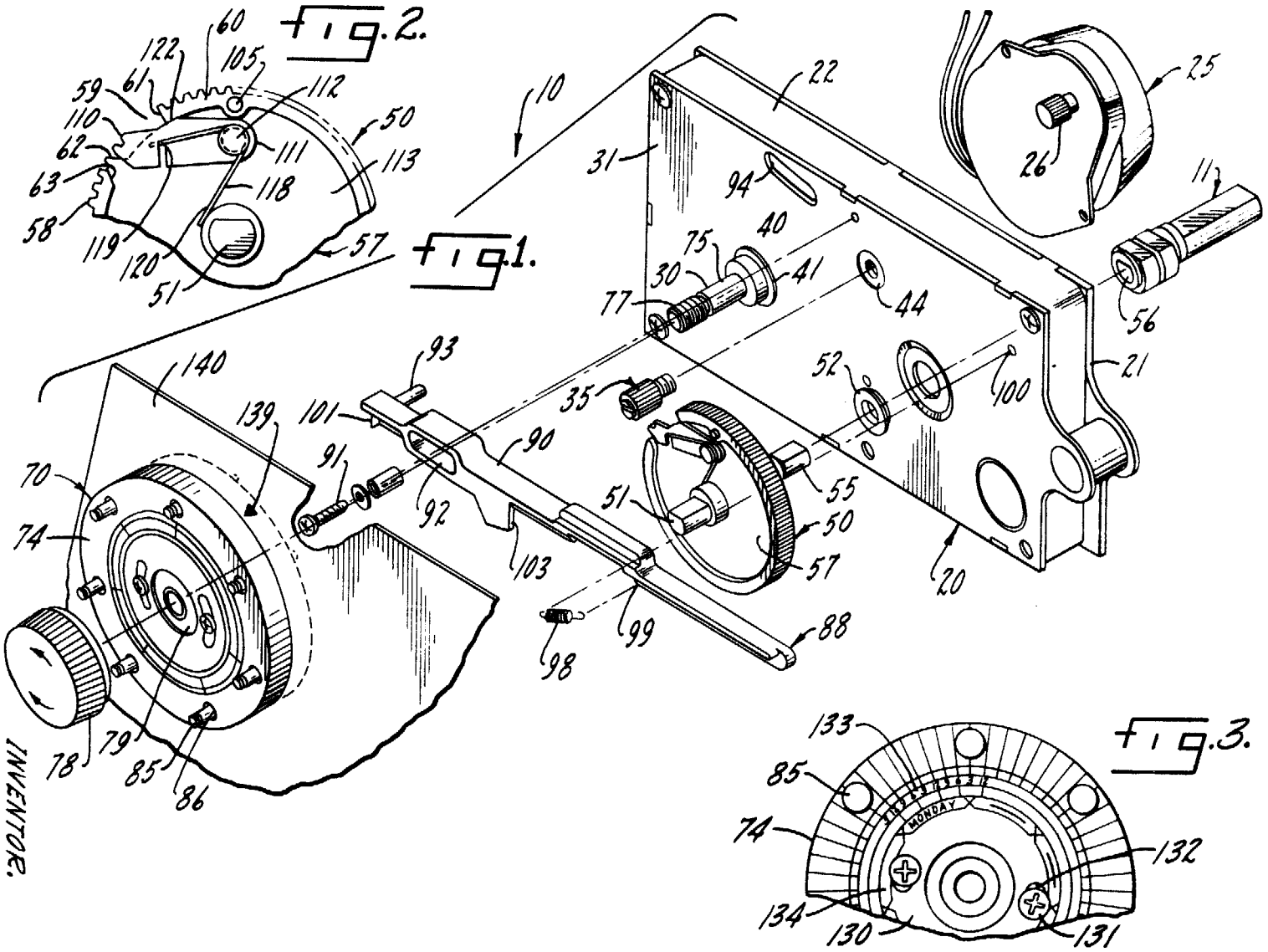
INVENTOR.
Edward J. Tischler,
BY Hume, Clement, Hume & Lee
Attorneys.

United States Patent Office

Re. 27,317
Reissued Mar. 28, 1972

27,317
TIMER

Edward J. Tischler, St. Paul, Minn., assignor to Ecodyne Corporation, Chicago, Ill.

Original No. 3,448,625, dated June 10, 1969, Ser. No. 679,722, Nov. 1, 1967. Application for reissue Nov. 16, 1970, Ser. No. 90,030
Int. Cl. F16h *5/74*
U.S. Cl. 74—3.5 9 Claims

Matter enclosed in heavy brackets [ ] appears in the original patent but forms no part of this reissue specification; matter printed in italics indicates the additions made by reissue.

ABSTRACT OF THE DISCLOSURE

A timing device for operating a mechanism at a predetermined time on a given day or days. The device includes a timer dial and a pinion driven by separate gear trains from the same motor and constantly in operation. A mechanism drive gear is connected to the pinion and rotated by it at said time through an actuator arm manipulated by the timer dial.

*This is an application for reissue of Pat No. 3,448,625, issued June 10, 1969, on an application, Ser. No. 679,722, filed Nov. 1, 1967.*

This invention relates in general to a timing device and more particularly to a timing device for cycling service and regeneration in a water conditioning system or the like.

Numerous timing devices have been developed for water conditioning systems and similar liquid treatment operations. Each serves, in one way or another, to cycle the manipulation of a control valve arrangement according to a pre-set schedule. During by far the greatest portion of a one week period, for example, normal service water conditioning takes place under the aegis of the control valve arrangement. At a pre-selected time on a given day or days the timing device automatically signals valve operating means to manipulate the valve arrangement and sequentially cycle various phases of regeneration, including backwash, brining, and rinse, for example.

A timing device of the aforedescribed type is disclosed in the U.S. Rose Patent No. 3,118,028. Another example of such a device is disclosed in the Hiers et al. Patent No. 3,273,403. The latter patent is assigned to the same assignee as the present invention.

The present invention is embodied in a timing device of the general character described above and disclosed in the aforementioned patents. However, it is simpler, less expensive and more reliable in operation than any known timing device of this type. Its reliability flows from the novel construction and operation of the timing device which permits the use of a bare minimum of simple and simply related cooperating parts.

In the timing device of the invention, a simple electric motor drives a timing dial at a prescribed constant speed through a conventional gear train. At the same time, the motor drives a valve actuator pinion at another prescribed constant speed determined by a collateral and, also, conventional gear train relationship. At a selected time on a given day, the timing dial effects rotation of a valve actuator gear until the gear engages and meshes with the valve actuator pinion, whereupon the pinion begins rotating the valve actuator gear through a single revolution. The valve actuator gear is connected to a broadly conventional cam arrangement which manipulates the valve arrangement to cycle regeneration of the system during the time required for the valve actuator pinion to drive the valve actuator gear through the one revolution, usually approximately one hour. The gear ceases rotation after one revolution, service treatment is reinstituted, and the gear remains still until regeneration is once more called for by the timing device.

The invention, both as to its organization and method of operation, taken with further objects and advantages thereof, will best be understood by reference to the following description taken in connection with the accompanying drawings, in which:

FIGURE 1 is an exploded view of the timing device embodying features of the present invention;

FIGURE 2 is a partial view of the timer gear assembly, and

FIGURE 3 is a partial view of the timer dial assembly.

Referring now to the drawings, and particularly to FIGURE 1, a timing device embodying features of the present invention is seen generally at 10. The timing device 10 is adapted to manipulate a valve arrangement (not shown) for a water conditioning system or the like through a multiple cam operator shaft 11. The multiple cam arrangement forms no specific part of the invention, and, accordingly, it is not illustrated or described in detail. Suffice it to say that as the shaft 11 rotates at the instance of the timing device 10, the multiple cam arrangement is effective to manipulate the aforementioned valve arrangement to cycle service and regeneration in a water conditioning system, for example.

The timing device 10 is preset to operate the cam arrangement at a selected time on a given day or days to initiate and cycle regeneration of the conventional resin bed in the treatment system. During normal operation of the system, the water is being treated to remove hardness inducing ions over 24 hours a day, on the great majority of the days in a week. On a day or on selected days, the timing device 10 initiates and continues rotation of its cam operator shaft 11 for a period of approximately one hour, during which period the aforementioned cam arrangement manipulates the valve arrangement through various regeneration cycles, including backwash, brining and rinse cycles for example.

The timing device 10 includes a generally rectangular gear box 20 mounted on top of the aforementioned valve arrangement (not shown) in upright relationship. The gear box 20 includes a back plate 21 and a front plate 31 spaced by a molded plastic body 22. According to the invention, the plastic body 22 not only acts as a spacer and a housing for conventional gear means bust also provides built-in plastic bearings for gear shafts. Mounted on the back plate 21 of the gear box 20 is a conventional electric motor 25. The motor 25 is a 60-cycle, synchronous electric motor which turns its output pinion 26 at a constant speed of one revolution every five minutes. The motor 25 acts as a timing element to time the service and regeneration cycles, and as a prime mover for driving the cam operator shaft 11 to manipulate the valve arrange (not shown) of the water conditioning system.

The pinion 26 of the motor 25 extends into the gear box 20 where it meshes with two gear trains, neither of which is shown because each is conventional. One of the gear trains in the gear box 20 is effective to transmit rotation of a timer shaft 30 extending from the front plate 31 of the housing 20. The other gear train is effective to transmit rotation to a valve actuator pinion 35 also extending from the front plate 31 of the housing 20.

As has been pointed out, the motor 25 is effect to drive its output pinion 26 at a constant speed of one revolution every five minutes. The conventional gear train within the gear box 20 which connects the pinion 26 to the timer shaft 30 reduces the rate of rotation of the shaft 30 to one complete clockwise rotation every 168 hours. The 168 hour period is significant to the timing function of the device 10, of course, and can be divided into seven 24-hour segments, or seven days. This relationship will hereinafter be discussed in detail. With minor gear changes, a six-day 144 hour cycle can also be arranged. The shaft 30, including an enlarged inner section 40, rotates in a plastic ring bearing 41 seated in the face plate 31 of the gear housing 20.

The motor 25, through the aforementioned second gear train, rotates the valve actuator pinion 35 in a counterclockwise direction at a constant speed of one revolution every fifteen minutes. The significance of the rate of revolution of the pinion 35 will also hereinafter be discussed. The pinion 35 is, as will be noted, rotatable in a plastic ring bearing 44 seated in the face plate 31 of the gear housing 20.

Also mounted on the face plate 31 of the gear housing 20 is a regeneration-timer gear assembly 50. The regeneration timer gear assembly 50 is fixed to a shaft 51 rotatable in a plastic ring bearing 52 seated in the face plate 31. The shaft 51 extends through the front face plate 31 and the back face plate 21, where it is seated for rotation in a corresponding ring bearing (not shown). The rear end 55 of the shaft 51 is seated in an appropriately formed seat in the front end 56 of the cam operator shaft 11 so that the cam operator shaft 11 is rotated by the shaft 51 when the shaft 51 is rotated.

The gear assembly 50 includes a cast-metal gear 57 having gear teeth 58 formed around approximately 340 degrees of its periphery. Referring specifically to FIGURE 2, the remaining 20 degrees of the periphery are cut out, as at 59.

A flange 60 is formed around the periphery of the outer face of the gear and the teeth 58 extend out onto the flange 60, as will be noted. At one side 61 of the cut-out 59, the teeth 58 and the flange 60 terminate coincidentally. At the other side 62 of the cut-out, however, the flange 60 and the portion of the teeth 58 carried thereby terminate approximately 10 degrees short of the side 62, as at 63. The significance of this relationship will hereinafter be discussed.

The diameter of the gear 57 and the position of the shaft 51 are such that the teeth 58 mesh with the pinion 35 when the cut-out 59 is not radially aligned with the pinion. As such, the continuously rotating pinion 35 is effective to rotate the gear 57 in a clockwise direction until the side 61 of the cut-out 59 is reached. At this point, the pinion 35 continues to rotate while the gear 57 stops rotating. This constitutes the end of a regeneration period signalled by the timing device 10.

During normal service treatment of water by the conditioning system, the pinion gear 35 is positioned opposite the cut-out 59 of the gear 47. In order to initiate regeneration, it is necessary for the pinion gear 35 to mesh once again with the peripheral teeth 58 on the gear 57, and rotate the cam operator shaft 11 through one revolution. The manner in which this is accomplished is a feature of the invention.

Referring now to FIGURES 1 and 3, a timer dial assembly 70 is mounted on the timer shaft 30. The timer dial assembly 70 comprises a molded plastic disc 74 seated on the non-threaded section 75 of the shaft 30 and against its enlarged section 40. Threaded onto the threaded end section 77 of the shaft 30 in front of the disc 74 is a locking cap 78. The locking cap 78 is adapted to be threaded into engagement with the flat-circular face section 79 in the center of the disc 74 to fix the disc for rotation with the shaft 30 in a clockwise direction.

Mounted in the disc 70 on axes parallel to the shaft 30 in spaced relationship adjacent the periphery of the disc are seven "day set" pins 85. Each day set pin 85 extends through a corresponding aperture 86 in the disc 74 and is slidable in its aperture between an "in" position and an "out" position. When a pin 85 is in its "in" position, it extends approximately ⅛ inch outwardly of the back of the disc 74, as seen in FIGURE 3. In contrast, when a pin is in its "out" position, it is retracted completely into a corresponding aperture 86 in the disc 74.

As the disc 74 is rotated by the drive motor 25, any pin 85 which is in its "in" position is effective, at one point in the circular path it follows, to actuate a trip arm assembly 88 mounted on the front plate 31 of the gear housing 20. The trip arm assembly 88 rotates the gear assembly 50 in a clockwise direction until the pinion gear 35 is once again engaged. The pinion gear 35 then proceeds to drive the gear assembly 50 through one revolution to cycle regeneration in the manner hereinbefore discussed.

The trip arm assembly 88 comprises an elongated molded plastic arm 90. The arm 90 is mounted on the front plate 31 of the gear housing 20 by a mounting pin 91 fixed to the face plate and extending through an elongated slot 92 in the arm. In turn, a plastic pin 93 formed unitarily with the arm 90 extends into an identical elongated slot 94 formed in the plate. It will thus be seen that the arm 90 is transversely movable on the plate 31 to an extent limited by the length of the identical slots 92 and 94. Its movement is in a path generally tangential to the disc 74.

Normally the arm 90 is biased toward the timer dial assembly 70 by a coil spring 98 in tension between the arm 90 at 99 and the plate 31 at 100. As such, the actuator finger 101 depending from one end of the arm 90 adjacent the disc 74 is in position to be engaged by any day pin 85 which is in its "in" position, as the disc rotates. When the finger center 101 is engaged by an "in" pin 85, further rotation of the disc 74 drives the arm 90 to the right, as seen in FIGURE 1. A depending lip 103 on the arm 90 then engages an abutment 105 formed on the flange 60 of the gear 57 and rotates the gear 50 in a clockwise direction.

When the gear 57 has been rotated through slightly less than 20 degrees in a clockwise direction, the pinion 35 engages two gear teeth 110 formed on a gear segment 111 pivotally mounted on a pin 112 extending from the web 113 of the gear 57. The gear segment 111 extends into the cut-out 59 in the gear 57 so that the teeth 110 effectively for man extension of the teeth 58 adjacent to the cut-out 59 in the gear at the side 62 of the cut-out. The segment 111 is normally biased into this position by a V-spring 118 encircling the pivot pin 112 and having one arm seated in a receiving slot in the segment 111, as at 119, and the other arm extending behind the shaft 51, as at 120. A protrusion 122 on the segment 111 abuts the flange 60 to stop the segment in this position.

Because the flange 60 of the gear 57 terminates at 63 short of the side 62 of the cut-out 59, the segment 111 can pivot in a counterclockwise direction about its mounting pin 112 against the bias of the spring 118. When the gear 57 is rotated in the aforedescribed manner by the actuator arm 90, the pinion 35 first engages the teeth 110 on the segment 111. If the pinion 35 and teeth 110 do not immediately mesh, the segment 111 is forced to rotate slightly in a counterclockwise direction against the bias of the spring 18 until it can slip back into its stopped position in meshed relationship. The entire gear 57 is then forced to rotate in a clockwise direction by the pinion 35. Immediately upon passing the teeth 110, the pinion 35 engages the gear teeth 58 and the single revolution of the gear assembly 50 is effected. A single revolution takes approximately 112 minutes, slightly more time than is required for the combined regeneration cycles.

Rotation of the gear assembly 50 rotates the cam actuator shaft 11 in a manner hereinbefore discussed. Regeneration is effected with its various cycles sequentially initiated by the aforementioned cam arrangement. Shortly before the gear 57 has completed one revolution, regeneration is completed. When the gear 57 has completed a revolution, its teeth 58 pass out of engagement with the pinion 35 and, although the pinion continues to rotate, rotation of the gear ceases. The timing device 10 is now pre-set for the next regeneration.

As has been pointed out, the timing device 10 is capable of programming regeneration for a fixed time on any given day or days. In this light, each of the day pins 85 in the timer disc 74 represents a 24-hour period, or, for all practical purposes, one complete day. Referring to FIGURE 3, a time and day setting plate 130 is mounted on the face of the disc 74 with two mounting screws 131 extending through lost motion slots 132 in the plate. The periphery of the plate 130 is divided by suitable indicia 133 into fourteen 12-hour periods. An inner circle 134 of indicia on the plate 130 includes day markings, each of which encompasses two adjacent 12-hour periods, thus forming a 24-hour day. Each pin 85 is circumferentially displaced opposite the appropriate day period.

To set the timing device 10 for a selected day and time, a householder, for example, need merely push in the day pin 85 opposite the selected day. Then the screws 131 are loosened so that the plate 130 is rotatable on the face of the disc 74 until the desired time selected for regeneration is aligned with the center of the pin 85 which has been pushed in. The screws 131 are then tightened down to fix the plate 130 to the disc 74 once more.

The next step is to loosen the cap 78 affixing the disc 74 to the shaft 30 for rotation therewith. The entire disc 74 is then rotated relative to the shaft 30 to a point where an arrow 139 on the face plate 140 of the timing device 10 is aligned with the correct time of day on the day that the setting is made. The position of the arrow 139 on the face plate 140 is dictated by the position which the "in" day pin must reach in its travel before it has forced the arm 90 sufficiently to the right to cause the gear assembly 50 to rotate counterclockwise and engage the pinion 35. Once the pin 85 in question passes this arrow 139, it slips off the finger 101 and the arm 90 is retracted by the spring 98.

A timing device 10 has now been described which is ultimately simple in construction and has a minimum of moving parts. It is extremely reliable, relatively inexpensive to manufacture, and requires a minimum of instructions to operate.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A timing device for controlling the operation of responsive means according to a schedule, comprising:
   (a) motor means rotating timer dial means at a predetermined rate,
   (b) said motor means also rotating pinion means at a predetermined rate,
   (c) gear means adapted to be operatively connected to the responsive means,
   (d) said gear means including a ring gear having a series of gear teeth on a major section of its periphery,
   (e) a minor section of said periphery being relieved of gear teeth,
   (f) said gear means being arranged relatively to said pinion means whereby said pinion means is ineffective to mesh with and rotate said gear means when said pinion means is radially aligned with at least a portion of said minor section,
   (g) arm means for initially rotating said gear means to cause said gear teeth to mesh with said pinion means whereby said pinion means rotates said gear means through said major section before said gear means comes to rest once more,
   (h) and means on said timer dial means for causing said arm means to initially rotate said gear means [.],

*(i) said arm means comprises an elongated arm member having an actuator finger formed on one end,*
   *(j) said timer dial having a plurality of day pins seated therein and movable from an "out" position to an "in" position,*
   *(k) the movement of a day pin to its "in" position and rotation of said timer dial means in a clockwise direction being effective to cause said day pin to engage said finger and drive said arm member toward said gear means to rotate said gear means.*

2. The timing device of claim 1 further characterized in that:
   (a) said gear means includes a gear segment pivotally mounted on said ring gear,
   (b) said gear segment having a free end normally disposed in substantially radial alignment with said minor section, whereby gear tooth means on said free end is co-extensive with said gear teeth at at least one end of said major section,
   (c) said tooth means meshing with said pinion means when said timer means causes said arm means to initially rotate said gear means.

3. The timing device of claim 2 further characterized by and including:
   (a) resilient means normally biasing said gear segment toward said one end of said major segment,
   (b) and stop means positioning said gear segment with said tooth means co-extensive with said gear teeth at said one end of said major section, whereby said gear segment can retract against the bias of said resilient means if said pinion means does not immediately mesh upon engagement with said tooth means.

4. The timing device of claim 3 further characterized by and including:
   (a) a flange formed around the periphery of said ring gear,
   (b) said gear teeth being formed on said flange,
   (c) said flange being relieved adjacent said one end of said major section, whereby said gear segment can retract into said relieved area when engaged by said pinion means if a perfect mesh is not achieved immediately with said gear teeth.

[5. The timing device of claim 3 further characterized in that:
   (a) said arm means comprises an elongated arm member having an actuator finger formed on one end,
   (b) said timer dial having a plurality of day pins seated therein and movable from an "out" position to an "in" position.
   (c) the movement of a day pin to its "in" position and rotation of said timer dial means in a clockwise direction being effective to cause said day pin to engage said finger and drive said arm member toward said gear means to rotate said gear means.]

6. The timing device of claim [5] *4* further characterized in that:
   (a) said gear means has an abutment formed thereon,
   (b) and a lip formed on said arm segment,
   (c) said lip engaging said abutment to rotate said gear means in a clockwise direction when said arm means is dirven toward said gear means by said timer dial means.

7. The timing device of claim 1 further characterized in that:
   (a) said timer dial means comprises a dial member mounted for rotation on a rotatable shaft,
   (b) and lock means on said shaft for releasably locking said member to said shaft for rotation in prescribed relation to the shaft.

8. The timing device of claim 7 further characterized in that:
   (a) *said timer* dial means further includes a time disc mounted for rotational movement on said member, said time disc having time indicia thereon with which relationship between actual time and selected regeneration time can be set.

9. The timing device of claim 1 further characterized in that:

(a) said motor means is mounted on the back plate of a housing and said pinion means extends from the front plate of said housing, (b) said housing containing gear means connecting said motor means and pinion means and including a molded plastic body spacing said plates and providing gear shaft bearing means.

*10. A timing device for controlling the operation of responsive means according to a schedule, comprising:*

*(a) motor means rotating timer dial means at a predetermined rate,*

*(b) said motor means also rotating pinion means at a predetermined rate,*

*(c) gear means adapted to be operatively connected to the responsive means,*

*(d) said gear means including a ring gear having a series of gear teeth formed on a major section of its periphery,*

*(e) a minor section of said periphery being relieved of gear teeth,*

*(f) said gear means being arranged relatively to said pinion means whereby said pinion means is ineffective to mesh with and rotate said gear means when said pinion means is radially aligned with at least a portion of said minor section,*

*(g) arm means for initially rotating said gear means*

*to cause said gear teeth to mesh with said pinion means whereby said pinion means rotates said gear means through said major section before said gear means comes to rest once more,*

*(h) and means on said timer dial means for causing said arm means to initially rotate said gear means,*

*(i) said gear means includes a gear segment pivotally mounted on said ring gear,*

*(j) said gear segment having a free end normally disposed in substantially radial alignment with said minor section, whereby gear tooth means on said free end is co-extensive with said gear teeth at at least one end of said major section,*

*(k) said tooth means meshing with said pinion means when said timer means causes said arm means to initially rotate said gear means.*

References Cited

The following references, cited by the Examiner, are of record in the patented file of this patent or the original patent.

UNITED STATES PATENTS

| | | | |
|---|---|---|---|
| 2,960,582 | 11/1960 | Harris | 200—38 DA |
| 3,362,467 | 2/1967 | Prosser | 74—3.5 |

MILTON KAUFMAN, Primary Examiner

U.S. Cl. X.R.

200—38